Dec. 16, 1941.  C. F. WRIGHT  2,266,389
MEANS FOR ALIGNING AND FEEDING BOX MEMBERS
Filed Nov. 30, 1940
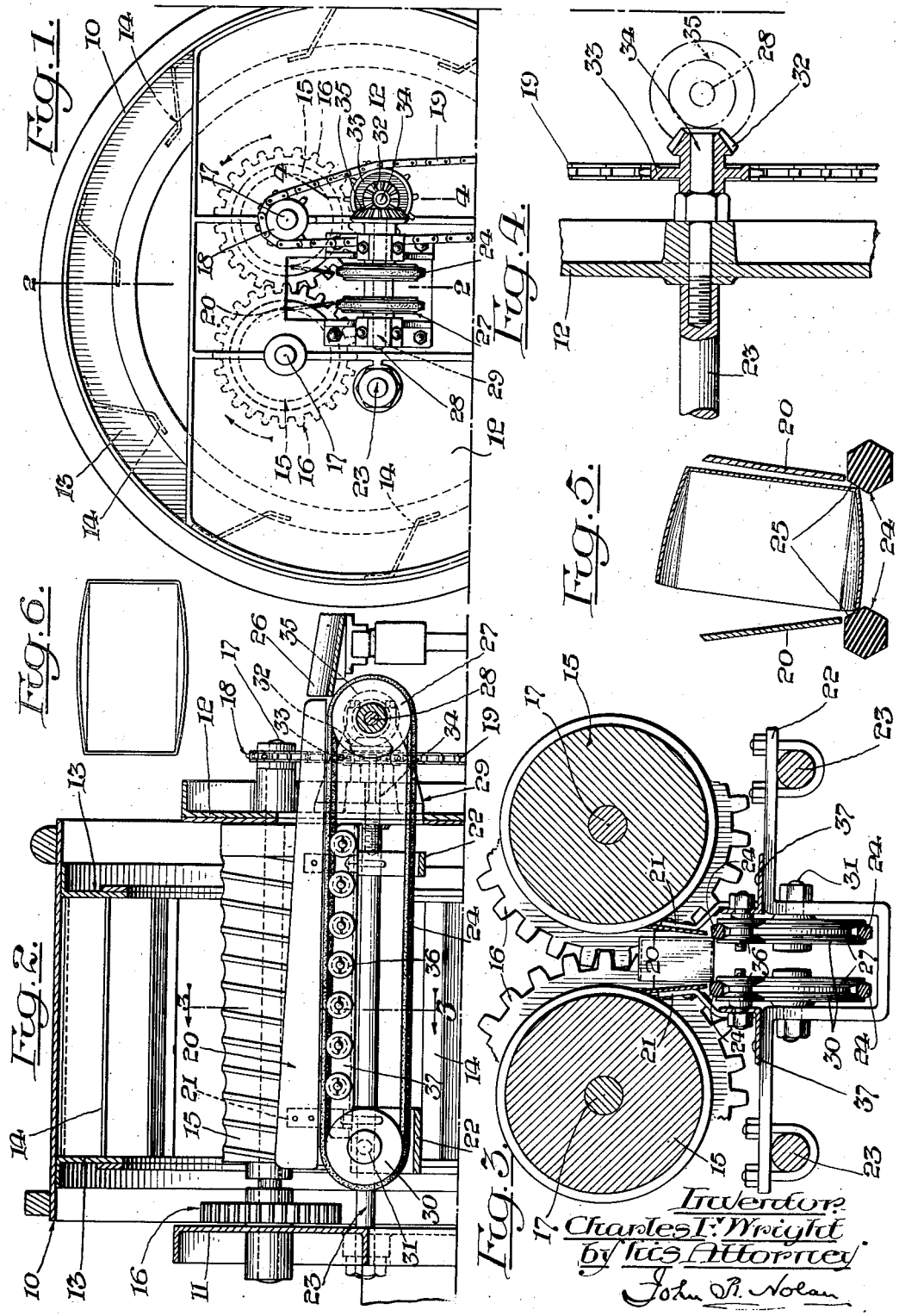

Patented Dec. 16, 1941

2,266,389

UNITED STATES PATENT OFFICE 2,266,389

MEANS FOR ALIGNING AND FEEDING BOX MEMBERS

Charles F. Wright, Akron, Ohio, assignor to The Diamond Match Company, New York, N. Y., a corporation of Delaware Application November 30, 1940, Serial No. 367,906

1 Claim. (Cl. 198—165)

This invention relates to mechanism for separating promiscuously disposed box trays and properly positioning them for delivery in endwise succession to a box filling machine.

As heretofore constructed such mechanism includes a guide trough, an endless conveyer therein lengthwise of the trough upon which conveyer the trays are deposited end to end, with one of the long narrow sides of each of the trays resting on the conveyer, and a vibrating transfer chute of U-form cross-section declining from the trough to the path of the tray holders of the filling machine, each succeeding tray being advanced and delivered by the conveyer to the chute. When the tray has entered the chute the tray gravitates, bottom down, to a flat position preparatory to the introduction of the tray into the tray holder in alignment therewith. In the case of trays having bulging sides a relatively small area of the tray rests on the conveyer, and owing to the small frictional contact therebetween a relative slippage of the tray and conveyer occurs, thus causing an uneven end-to-end feeding of the trays and sometimes the formation of an extended gap or gaps in the row with resulting non-delivery of a tray or trays to the filling machine unless the omission be manually corrected in the transfer chute.

The object of my invention is to overcome the objection incident to the presence of irregular or laterally bulging trays, and to that end I provide a simple and efficient tray-feeding mechanism embodying a pair of conveyer belts arranged in spaced parallel relation, said belts having oppositely inclined surfaces which uniformly receive and grip between them the respective longitudinal edges of a narrow side of each succeeding tray delivered thereto, thus ensuring a uniform end-to-end feeding of the trays, whether their sides be straight or bulged.

The invention also comprises features of novelty which will be hereinafter described, the scope of the invention then being expressed in the appended claim.

In the drawing—

Figure 1 is a partial end elevation of a tray handling apparatus embodying my invention.

Fig. 2 is a vertical section of the same, as on the line 2—2 of Fig. 1.

Fig. 3 is a transverse section, in a plane through the spaced helically formed rolls within the rotary drum to which the trays are promiscuously delivered, as on the line 3—3 of Fig. 2.

Fig. 4 is a sectional detail of gearing for actuating the rolls and the conveyer belts, as on the line 4—4 of Fig. 1.

Fig. 5 is a sectional detail of the spaced conveyer belts and an overlying trough or guide element, showing a bulging tray embraced and gripped by the belts.

Fig. 6 is a plan of a laterally bulged tray.

Referring to the drawing, 10 designates a drum which is mounted to rotate between end heads 11 and 12, and which drum has suitably-disposed guard rings 13 between which are supported spaced vanes 14, the construction being such that during the rotation of the drum trays promiscuously introduced therein below the axis of the drum are caught by the vanes and raised to a position where they drop.

A pair of rotatable tapering helical rolls 15 are journaled in bearings in the end housings and are connected for reverse rotation toward each other through suitable gears 16 fast on the shafts 17 of the respective rolls adjacent the end head 11, one of the shafts having adjacent the end head 12 a sprocket wheel 18 actuated by a power driven chain 19 as usual. The rolls 15 are so positioned that the trays which drop from the travelling vanes 14 fall upon and between the rolls, which rolls function to carry backward all surplus trays deposited thereon, yet permit a sufficient number of the trays to pass longitudinally between the rolls and into a trough arranged between and longitudinally of the rolls, and also to remove from the trough and return to the accumulated trays above the rolls any trays that may happen to be endwise disposed within the trough, as described in Letters Patent of the United States No. 1,086,210, dated February 3, 1914. In the present instance the trough comprises spaced side walls 20 supported by brackets 21 rising from yoke members 22 secured to tie rods 23 between the end heads 11 and 12.

According to my invention a pair of endless concurrently driven belts 24, of rubber or other suitable yielding material, are arranged with their upper runs adjacent and longitudinally of the lower edges of the side walls of the trough, which belts are of polygonal cross-section to provide two oppositely-inclined surfaces 25 adapted to support and grip between them the respective lower longitudinal edges of one of the long narrow sides of each succeeding tray properly delivered between the walls of the trough, which walls are preferably slightly downwardly convergent in order to guide the trays to and between the opposing inclined surfaces 25 of the belts. Hence the lower side edges of each of the trays are efficiently gripped by the belts and a uniform end-to-end feeding of the trays to the usual transfer chute 26 is insured, and this whether the sides of the vibrating tray be flat or bulged, as seen in Figs. 3 and 5. Moreover, the gripping surfaces of the belts, by virtue of their angular relation, permit the ready lifting and removal of up-ended trays by means of the larger ends of the rotating rolls 15.

The belts 24 are trained about two pairs of sheaves whereof the head sheaves 27 are fast on a shaft 28 having its bearings in brackets 29 on the end head 12, and whereof the tail sheaves 30 are loose on studs 31 affixed to the depending limbs of the yoke 22.

In the present instance the sprocket chain 19 which drives the feed rolls 15 is utilized to actuate the head sheaves 27 for the conveyer belts. To that end the hub of a combination bevel gear 32 and sprocket wheel 33 is loosely mounted on a stud 34 projecting from the end head 12, the teeth of the wheel 33 being in mesh with one run of the chain 19 and the bevel gear 32 in mesh with a similar gear 35 on the head shaft 28. The upper or active runs of the respective belts 24 are uniformly supported by spaced idler rolls 36 loose on lateral studs projecting from longitudinal brackets 37 on the yokes 22, which rolls reduce the friction on the runs and also maintain them in spaced parallel relation. This construction enables the quick changing of the endless belts as occasion may require, because the only work to be done in removing the belts is to detach the head shaft carrying the drive sheaves.

The provision of the open space between the belts 24 prevents the accumulation of dirt or other foreign material that might otherwise impede the passage of the trays in their travel with the belts toward the transfer chute.

I claim:

In mechanism of the kind described embodying a trough-like guide element and means for positioning box members within the guide element, with a long narrow side of each member in down position and longitudinally of the guide element, a conveyer extending longitudinally of the guide element and comprising spaced longitudinal belts in close relation to the respective sides of the guide element, said belts having oppositely-inclined gripping surfaces by and between which the lower edges of each succeeding box member within the guide element are held and supported, and means for actuating said conveyer.

CHARLES F. WRIGHT.